Figure 1:
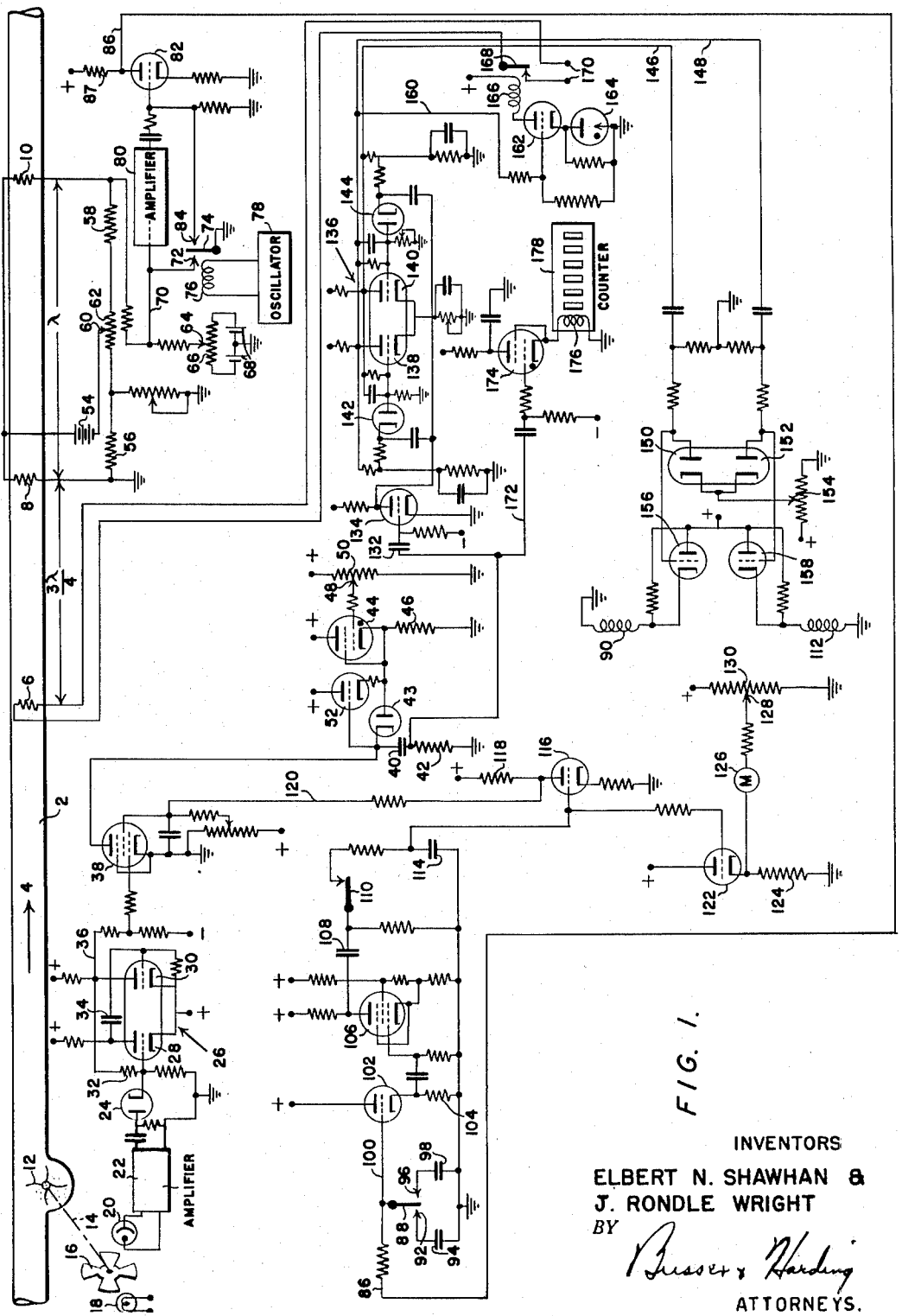

INVENTORS
ELBERT N. SHAWHAN &
J. RONDLE WRIGHT

Nov. 22, 1955  E. N. SHAWHAN ET AL  2,724,271
THERMAL FLOWMETER

Filed Jan. 3, 1950  2 Sheets-Sheet 2

INVENTORS
ELBERT N. SHAWHAN &
J. RONDLE WRIGHT
BY
ATTORNEYS.

United States Patent Office 2,724,271
Patented Nov. 22, 1955

2,724,271

THERMAL FLOWMETER

Elbert N. Shawhan and J. Rondle Wright, Morton, Pa., assignors to Sun Oil Company, Philadelphia, Pa., a corporation of New Jersey Application January 3, 1950, Serial No. 136,496

9 Claims. (Cl. 73—204)

This invention relates to a flowmeter of volumetric type, and has particular reference to a type of flowmeter having an accuracy as good as mechanical types of flowmeters and requiring less maintenance due to the simplicity of the parts which are in contact with the liquid undergoing measurement.

If a liquid travels through a pipe with turbulent motion it is found that all parts of the fluid have nearly the same average velocity along the pipe. If a slug of liquid is somehow marked at a particular instant during its flow so that it may be said to have at the time of marking well-defined leading and trailing boundaries, it will be found that this slug maintains its identity to a fair degree of approximation over a substantial length of flow path. Its leading and trailing boundaries do become somewhat confused and indefinite by virtue of admixture of its liquid with that preceding and succeeding the slug, but if the slug is of substantial extent in the direction of motion its identity is well maintained. The indefiniteness which accumulates along the path of flow is due primarily to friction of the liquid with the walls of the pipe. However, this friction does not rapidly dissipate the boundaries.

In accordance with the present invention slugs of a flowing liquid are marked in the sense of having their temperatures raised by a heating means which is turned on and off intermittently. It will be evident that if a slug was so marked the velocity of the liquid through a pipe could be measured by measuring the spacing (the wave length) between slugs marked with constant frequency. Alternatively, if the wave length between successive marked slugs was maintained constant, the volumetric quantity of liquid passing a given point would be proportional to the number of slugs counted as passing that point, i. e., the rate flow would be proportional to the frequency of the slugs. In accordance with the present invention it is the latter principle which is used for determining the volume of flow. In brief, in accordance with the invention, there is located in a pipe a heater and a pair of thermometer grids, which latter will cooperate to detect the elevated temperature of slugs of liquid heated by the heater. Provision is made to control the heater so that a fixed wave length is approximately maintained at all times, the wave lengths being adjusted to the fixed value if, due to change of flow rate, the wave length tends to decrease or increase.

The broad objects of the invention are concerned with the general attainment of measurement in accordance with what has been described above.

Figure 2:
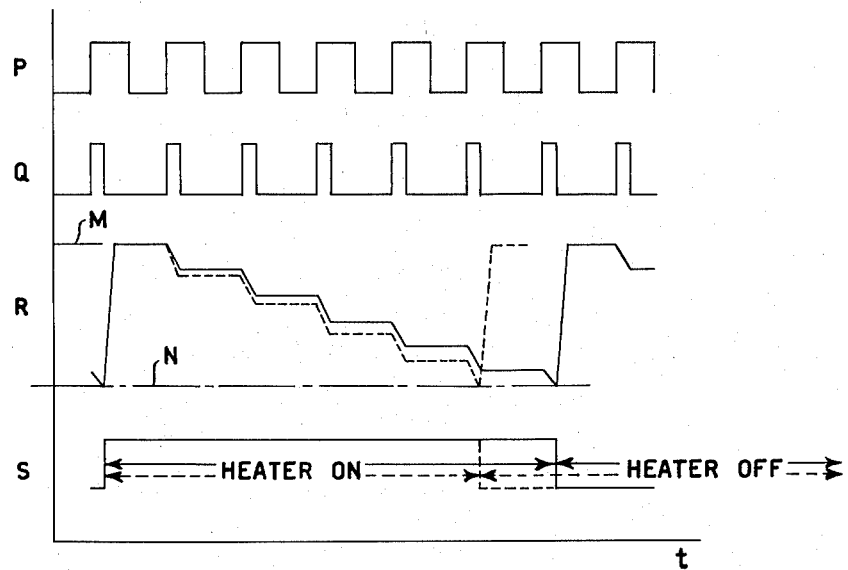
Figure 3:
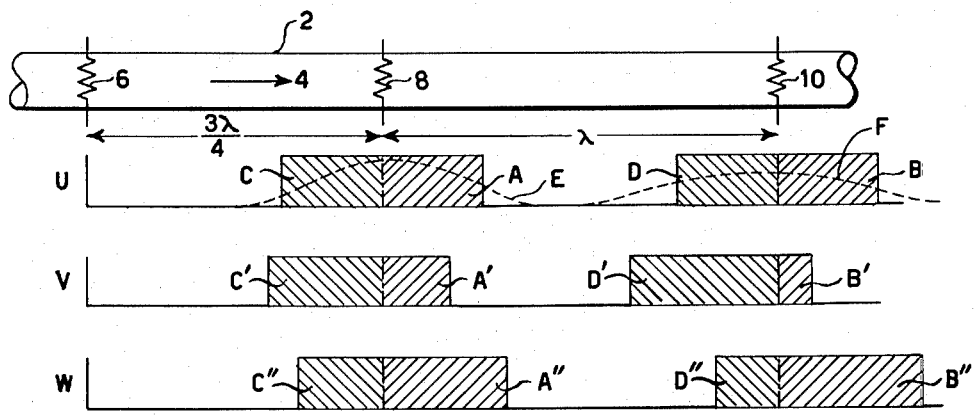

Various other objects of the invention are concerned with the achievement of proper results in simple and reliable fashion and in particular in such fashion as will prevent errors due to sudden changes in flow rate. These and other objects of the invention particularly relating to details of apparatus and its operation will become apparent from the following description read in conjunction with the accompanying drawings, in which:

Figure 1 is a wiring diagram showing the details of a preferred embodiment of the invention; and Figures 2 and 3 are diagrams which serve to illustrate the nature of operation of the apparatus.

It may be noted that while the apparatus described is particularly applicable to liquids, it may also be applied to the measurement of volume of flow of gases. However, for simplicity of description reference will be hereafter confined to the measurement of flow of liquids.

The apparatus will first be described with particular reference to Figure 1 without discussion of the general purposes of the apparatus. Thereafter, there will be discussed the mode of operation and in particular the nature of the provisions for maintaining accuracy and reliability.

The liquid undergoing measurement flows through a pipe or other suitable conduit tube in the direction of the arrow 4. Within the pipe 2 there is a heater 6 which may take the form of a grid of resistance wire. As illustrated in Figure 1, beyond the heater 6 there are a pair of thermometric elements 8 and 10 which may take the form of grids of fine nickel wire. It will, however, become evident that other temperature measuring devices may be used in place of these resistance grids, such as thermocouples, or the like. As will be pointed out hereafter the relative arrangements of the grids and heater may differ from that illustrated in Figure 1; but the apparatus will be first described as involving the illustrated arrangement. It may be here mentioned that consistent with the assumption of maintenance of a constant wave length, the heater 6 will be spaced from the first thermometric grid 8 by a distance equal to three-quarters of the desired wave length. The grids 8 and 10 are spaced by a full wave length.

Located in the pipe 2 either in advance of or following the elements just described is an impulse wheel 12 arranged to be rotated by the flow of the liquid. As will be pointed out hereafter the revolutions of this wheel are not depended upon for accuracy of measurement, but the wheel serves as a monitoring device to insure desired operation of the apparatus. The wheel 12 is arranged to drive through a shaft connection indicated at 14, a chopper disc 16 arranged occult the light from a lamp 18 falling on a photocell 20. The result is to produce from the photocell 20 pulses which are proportional in frequency to the velocity of flow of the liquid to a fair degree of approximation. The pulses from the photocell are amplified by a conventional amplifier 22 and are fed through a diode 24, which suppresses negative pulses, to a so-called one shot multivibrator indicated generally at 26. This type of multivibrator is well known and is described for example in "Waveforms" by Chance et al., volume 19, Radiation Laboratory Series, 1949. It comprises a pair of triodes 28 and 30 with the anode of triode 30 connected to the grid of triode 28 through resistance 32, and with the anode of triode 28 connected through condenser 34 to the grid of triode 30. The input from the diode 24 is to the grid of triode 28 and the output from the multivibrator is delivered through connection 36 to the control grid of a pentode 38. The function of the multivibrator is to produce at the output of 38 pulses of definite duration and at the frequency of the pulses delivered from the photocell 20. In its stable state the triode 30 is conducting and the triode 28 is non-conducting. When a positive pulse is received by a grid of the latter the triode 28 conducts and the triode 30 is cut off. Then after a predetermined time depending upon the circuit constants, the multivibrator reverts to its stable state. The result of this cycle of operation is the delivery of a positive pulse of fixed duration through the output connection 36. The screen grid of the pentode 38 is normally maintained at a low positive potential. Its control grid is, when the multivibrator is in its stable state, at a sufficiently negative potential so that the pentode 38 is cut off. The positive pulse delivered to this grid from the multivibrator causes the pentode to become conductive only during the periods of the positive pulses. The anode of pentode 38 is connected to a condenser 40 and thence through resistance 42 to ground. This anode is also connected to the cathode of diode 43, the anode of which is connected to the cathode of a thyratron 44, the cathode of which is connected to ground through resistance 46. The anode of the thyratron is connected to a source of high positive potential. A triode 52 connected as illustrated serves to produce complete cut off of the diode 43 preventing any residual current through the thyratron 44 from charging the condenser 40 during periods when the thyratron is not firing. The firing point of the thyratron is adjusted by the setting of contact 48 on potentiometer 50 connected between a high positive potential source and ground.

There may now be discussed the operation of the circuit so far described. Assuming that the condenser 40 has received a positive charge through firing of thyratron 44, the grid of triode 52 will be at a relatively high positive potential and current flowing through the triode and resistance 46 to ground will result in a potential of the cathode of the thyratron 44 such that the cathode will be sufficiently positive with respect to the thyratron grid to prevent firing. In effect, then, the condenser 40 is isolated from the thyratron circuit and is effectively connected only to the anode of pentode 38. As stated previously, the screen grid of pentode 38 is only at a low positive potential with the result that each positive pulse on its grid may result in only a minor flow of current through the pentode to effect partial discharge of the condenser 40. Accordingly, the condenser 40 is discharged in successive steps, one step corresponding to each positive pulse received through diode 24 from the photocell. In view of the use of a pentode and the fixed duration of the pulses on the grid of the pentode 38, a fairly definitely fixed predetermined number of steps is required to produce such discharge of the condenser 40 as will result in lowering of the current through the triode 52 and consequent lowering of the potential of the thyratron cathode to the firing point. When the proper potential of the thyratron cathode is reached, the thyratron will fire, instantaneously recharging the condenser 40 and reestablishing a cut off condition of the thyratron. The cycle will then be repeated, with the result that the thyratron will fire and recharge condenser 40 each time there accumulates a predetermined number of pulses delivered from the photocell 20.

It may be here noted that it is desirable that each period between firings of thyratron 44 should include a large number of steps of discharge of the condenser 40. As will appear hereafter, the discharge steps are increased in amplitude or decreased in amplitude in accordance with a corrective signal. This results in having a firing of the thyratron occur an integral number of discharge steps less than or greater than a normal number and the smaller these steps are the less will be the percentage error due to the fact that integral steps only are involved and not fractions thereof.

The resistance grids 8 and 10 are arranged in a bridge including the resistances 56 and 58 and potentiometer resistance 62, the contact 60 of which is adjustable to balance the circuit and is connected to a battery for energizing the bridge indicated at 54. For additional balancing there is provided the potentiometer indicated at 66 having the adjustable contact 64 and energized by batteries 68. The direct output of the bridge is chopped for alternating current amplification since in general the output is of very low magnitude. To effect this the bridge output at 70 is connected to a contact 72 of a relay having an armature 74 acted upon by a coil 76 energized by an oscillator 78. This oscillator may be of any convenient type such as a phase-shift oscillator operating at a low audio frequency to which the relay is capable of responding. The armature 74 is grounded with the result that there is fed to the amplifier 80 a chopped signal which is subject to easy amplification. The output of the amplifier is synchronously rectified by its connection to the contact 84 also cooperating with the armature 74. The output thus rectified is fed to the grid of triode 82 provided with the anode load resistor 87. The output connection 86 accordingly receives a signal which is in its average amplitude dependent upon the difference of temperatures of the two grids 8 and 10, and is greater or less than some predetermined value depending upon which of them is subjected to a higher temperature.

Output connection 86 is joined to the relay armature 88 which operates between contacts 92 and 96 connected respectively to condensers 94 and 98 of equal capacity. The opposite sides of these condensers are grounded. The armature 88 is connected to the grid of a triode 102 arranged in a cathode-follower circuit including cathode resistance 104. The output of this is fed to the control grid of a pentode 106 which through condenser 108 feeds the armature 110 of a second relay which is controlled by an armature coil 112 hereafter more fully described. Synchronous rectification is secured in such fashion as to charge a condenser 114 with an error signal which is delivered to the grid of a triode 116 provided with an anode load resistance 118, the anode of triode 116 being connected through 120 to the screen grid of the pentode 38.

Since it may be desirable to note the error signal accumulating on the condenser 114 this may be connected to the grid of a triode 122 provided with a cathode resistor 124, there being connected between the cathode of triode 122 and the contact 128 of a potentiometer 130, connected between a positive potential source and ground, a meter 126 in the form of a galvanometer which will indicate the error voltage.

It will be noted that when the thyratron 44 charges the condenser 40 a considerable charging current will flow through the resistance 42 thus producing a high voltage positive pulse at the junction between the condenser and this resistance. The positive pulse thus secured is used as a control signal for various purposes.

This positive signal is fed through condenser 132 and phase-inverting triode 134 to the Eccles-Jordan trigger circuit indicated generally at 136. This circuit is of conventional type including the usual interconnections between triodes 138 and 140 and the input diodes 142 and 144.

The arrangement is such that upon one signal through condenser 132 the circuit is tripped to one of its alternate conditions and upon reception of the next signal is tripped to the other of such conditions. The result is that the same condition is attained upon every second signal received by this trigger circuit, the result being the emission of alternate positive and negative pulses through the lines 146 and 148.

The lines 146 and 148 are connected to clipping diodes 150 and 152, the connections being to the anodes of these diodes of which the cathodes are connected to the adjustable contact 154 on a potentiometer connected between a positive potential source and ground. The anodes of the diodes are connected to the grids of triodes 156 and 158 connected to the respective cathodes of which are the relay coils 90 and 112, the former serving for the operation of the armature 88 and the latter serving for the operation of the armature 110. It may be noted that these coils 90 and 112 will be alternately energized with the result that the relays are operated in synchronism with each other. The purpose of this will be hereafter made clear.

Connected to the line 148 through 160 is the grid of the triode 162, the grid normally having a fixed potential with respect to its cathode due to the presence of the voltage regulating tube 164. The triode 162 controls the current through the coil 166 of a relay having an armature 168 and serving to control the flow of heating current from the source 170 through the heater 6. It will be evident from the arrangement just described and the operation of the trigger circuit that the heater will be turned off at the instant of one firing of thyratron 44 and will be turned on at the instant of the next firing. The result is that if the flow is uniform and the impulse wheel 12 is operating at uniform speed the heater will be turned on and off for equal intervals.

Another connection to the junction between condenser 40 and resistance 42 is effected through the line 172 to the grid of thyratron 174, in the cathode circuit of which there is the coil 176 serving to operate a counter 178. The arrangement is such as to count the firings of the thyratron 44, the thyratron 174 being fired upon each such occasion. As will be clear hereafter, the counter 178 will give a reading which is directly proportional to the volumetric flow through the metering arrangement.

For a description of the operation reference may first be made to the portion of the circuit between the thermometer resistance bridge and the output line 86. By reason of the fact that the output of the amplifier 80 is rectified in synchronism with the chopping of the input, the effect is that of direct current amplification even though the amplification is actually carried out on an alternating current. In other words, the output line 86 will have an average value of potential which will rise as the bridge becomes unbalanced in one direction and will drop as the bridge becomes unbalanced in the other, the normal potential in this line corresponding to that of bridge balance, i. e., equal temperatures at the grids 8 and 10.

Reference may now be made to Figure 2. At P there are indicated the positive pulses delivered from the amplifier 22 which are differentiated and fed through the diode 24 to the single shot multivibrator 26. The beginnings of these pulses correspond to initiation of the pulses of uniform length delivered to the grid of the pentode 38, and these latter pulses are indicated at Q. The width of the pulses Q is relatively immaterial so long as their width is not greater than the minimum spacing expected between the pulses P corresponding to the maximum rate of flow which is to be measured. The frequency of the pulses P and Q should be relatively high so that a quite large number of these pulses will be produced during any normal period between firings of the thyratron 44. For simplicity of description, however, only a small number of the pulses P and Q will be considered as corresponding to a period during which the heater is either on or off.

At R there is indicated the condition of charge of condenser 40. Assume that at about the time of the first of the pulses Q the condenser has been charged by firing of thyratron 44 to its maximum potential. Consider now the full line curve at R corresponding to the absence of any corrective signal introduced to the screen grid of pentode 38 through connection 120. As has been pointed out the screen grid of this pentode is normally at a relatively low positive potential so that when it is rendered conductive by a positive pulse applied to its control grid it will pass only a relatively small current. This means that during each of the pulses Q a partial discharge of the condenser 40 will take place in steps as indicated. Finally, one of the pulses, in this case illustrated as the sixth following the condenser's recharge, will result in a lowering of the potential 40 to a value corresponding to that of firing of the thyratron 44, this value of potential being indicated at N. When this event occurs the condenser is recharged and the cycle repeats. So long as the screen grid potential remains constant and the amplitude of the pulses Q remains constant this means that the period between firings of the thyratron will correspond to a fixed predetermined number of the pulses Q.

As will presently appear, an error signal is applied at various times to change the potential of the screen grid of pentode 38. When this potential is varied the rate of current flow through the screen grid is changed so that the condenser 40 will be either more rapidly or more slowly discharged. The dotted curve at R indicates what occurs if the rate of discharge is increased by reason of an increase of positive potential of the screen grid. As will be apparent the potential indicated at N corresponding to firing of thyratron 44 may now be reached at the time of occurrence of a pulse earlier than normal, for example at the time of the fifth pulse rather than the sixth, as illustrated. Again, so long as the screen grid retained this now potential the periods between firings of thyratron 44 would be equal. While not illustrated, it will be evident that a lower rate of discharge corresponding to a less positive potential of the screen grid of pentode 38 might result in a delay of discharge to the potential N, for example, such that firing would only occur upon the occurrence of the seventh or some later pulse Q.

At S there are indicated the periods during which the heater is on and off corresponding to the full and dotted line curves R. As has been described the Eccles-Jordan circuit serves to divide by the scale of two and consequently the effect of the firings of the thyratron 44 is to turn the heater on at one firing, off at the next, and so on. In other words, the complete cycle of operation of the heater corresponds to two periods between firings of the thyratron.

As was indicated heretofore, the controlling action is such as to maintain constant the wave length of the heating cycles irrespective of the rate of flow of the liquid undergoing measurement. The wave length is the distance between the grids 8 and 10. As before indicated the distance between the heater 6 and the grid 8 is three-quarters of this wave length, though it may be any odd number of quarter wave lengths. A one-quarter wave length spacing is, however, not usually too satisfactory, if the pipe diameter is large since it is found that the heat distribution in the slug changes considerably at first in the first few pipe diameters of travel but thereafter remains nearly constant.

Reference may now be made to Figure 3, and first to the graph indicated at U. If it could be assumed that there was no dispersion of the leading and trailing boundaries of a heated slug of the liquid, the temperature condition could be indicated by the graph U as it would exist along the length of pipe at the instant when the heater 6 was turned on. The graph U assumes normal operation with the wave length constant and equal to the spacing between the grids 8 and 10. Under these conditions at the instant stated the rectangular waves of increased temperature would be centered about the locations of the grids 8 and 10.

Referring now particularly to the condensers 94 and 98 in Figure 1 and the switching action of the relay armature 88, it will be recalled that this armature moves from one position to the other at the instant of turning on or off the heater. Accordingly the time illustrated in graph U represents the instant of shift of the armature 88. Let it be assumed that prior to this instant contact was made to charge condenser 94 and after this instant the contact is shifted to charge condenser 98. The input on the line 86 corresponds in magnitude and direction to the balance condition of the thermometric bridge. While actually the input consists of rectified pulses it may be considered for purposes of description that there is a steady, though possibly slowly varying, direct potential existing in the line 86. Assuming equal temperatures at the grids 8 and 10, and assuming that the bridge has been balanced so as to give an effective zero output under the conditions of equal temperatures, it will be evident that the charge applied to the condenser 94 prior to the instant indicated may be measured by the difference between the areas similarly shaded at A and B, which difference is zero. (We will here speak only of variations from steady potentials existing in the circuit.) Similarly, the potential applied to the condenser 98 after the shifting of the armature 88 following the time instant under consideration would be represented by the difference of the areas C and D which, being equal, will have a difference of zero. The result of this would be no application of a corrective signal through the connection 120 to the screen grid of pentode 38. Accordingly, the indication being of proper wave length, the heater cycles would repeat continuously uniformly so long as there was no change in velocity of the liquid.

As a matter of fact, the rectangular temperature distribution indicated in U would not exist due to diffusion of the leading and trailing boundaries of the heated slugs of liquid, and instead the temperature conditions might be as indicated at E and F with a somewhat lower temperature at F than at E due possibly to cooling. This condition, however, causes no particular concern since the initial balancing of the bridge may take care of the real situation encountered to produce nevertheless a zero corrective signal for a condition which may somewhat artificially be said to represent a predetermined wave length condition, i. e., the existence of the particular distance between the grids 8 and 10 between certain phases of the temperature peaks indicated at E and F. To maintain simplicity of description it will hereafter be considered that rectangular distributions of temperature continue to exist, with the understanding that similar arguments, though somewhat more complicated in form, would still be applicable to justify proper operation of the system under real conditions.

Assume now that a situation such as that indicated at V arises. This would represent a situation in which the frequency of the heating cycles would be too great to correspond properly with the velocity of flow, so that, in effect, the wave length of the heat pulses would be too short. Under these circumstances the condenser 94 would receive a signal corresponding to the difference of the areas A' and B', while condenser 98 would receive a signal corresponding to the difference of the areas C' and D'. It will be noted that if the differences are taken in the order just given, the signal accumulating on the condenser 94 would be positive and the signal accumulating on the condenser 98 would be negative, the latter, however, being transformed by the synchronous rectification to a positive signal. The net result of this situation is to change the potential of the screen grid of pentode 38 so as to lower the frequency of the heat cycle which means that the screen grid would become more negative to lessen the amplitude of the discharging steps of the condenser 40. As will be evident from Figure 2 this would result in a lengthening of the half cycles of the heater.

The corrective action just described will continue until the frequency is readjusted to a condition of proper wave length of the heat pulses.

The opposite situation is indicated at W in Figure 3. Here the wave length is too long, and the signals applied to condenser 94 will be represented by the difference of A'' and B'' while the signals applied to condenser 98 will be represented by the difference of C'' and D''. As will be evident, the result will be to increase the potential of the screen grid of pentode 38 so as to increase the amplitude of the discharging steps of the condenser 40 and thus occasion a shortening of the half cycles of the heater.

As indicated above, while the heater and grid arrangement shown in Figure 3 is preferred, other arrangements are possible, for example, an arrangement in which the one thermometer grid precedes the heater, and the second thermometer grid is spaced downstream from the heater to the extent of five-fourths of the wave length which is desired to be maintained. An examination of this arrangement will reveal that a similar overall operation will result. However, such an arrangement is less desirable than that illustrated in Figure 3, due to the fact that in the arrangement of Figure 3 the two thermometer grids are always approximately at the same temperature and consequently the bridge amplification may be carried much further.

It will be noted that the monitor wheel 12 is not utilized directly to measure the flow through the counting of impulses produced by the occulating member 16 and photocell 20. The function of this is that of a monitor over the system. A study of either of the systems referred to above will reveal that possible conditions of operation might involve various fractions of wave lengths. For example, if the wave length were half of what is illustrated at U in Figure 3 it will be evident that the system would continue to function but, of course, erroneously. The last would be true in the absence of the monitor wheel 12. However, with this wheel and its control of the discharge steps of condenser 40 a condition is secured which will enforce continued operation only under the conditions described.

The impulse wheel also serves another purpose during the period in which the apparatus is starting up. For example, suppose the initial condition was zero flow and a valve was opened permitting a sudden increase in the flow rate. The integrating elements would then not know how to function since they would not yet have had time to integrate any pulses in order to establish the conditions for proper control. The impulse wheel thus becomes, in effect, the integrator for very rapid changes in flow rate. It responds, with very small time lag, to rapid changes of fluid velocity. During those periods when the error signal is changing more slowly than the stream velocity, the impulse wheel acts as a direct controller of pulse frequency. The monitoring device need not be very accurate since the integrated total of flow does not depend on it. Any device which is accurate to about plus or minus 5% will be satisfactory for this purpose and consequently other types of metering elements may be used, such as Venturi meters, orifice meters, or the like.

From the foregoing it will be clear that there is provided in accordance with the invention a flowmeter which is capable of measuring flow to a high degree of accuracy and involves a minimum of simple elements actually exposed to the flowing liquid. It will also be clear from the foregoing that the circuit elements may be widely varied from those specifically described. There may, for example, be used various types of trigger circuits and the like for forming, controlling and utilizing pulses in fashions which are common in the arts. Accordingly, it is to be understood that the invention is not to be construed as limited to the particular elements illustrated but only as defined by the following claims.

What is claimed is:

1. Apparatus for the measurement of fluid flow comprising a conduit for the fluid, means imparting heat to slugs of fluid flowing through said conduit, means responsive to the raised temperature of the heated slugs controlling the first mentioned means to maintain substantially constant the spacing of the heated slugs along the flowing fluid, and means counting the heated slugs which flow through the conduit.

2. Apparatus for the measurement of fluid flow comprising a conduit for the fluid, means imparting heat to slugs of fluid flowing through said conduit, means responsive to the raised temperature of the heated slugs detecting departure of the heated slugs from a predetermined spacing along the flowing fluid, means controlled by said detecting means in turn controlling the first mentioned means to maintain substantially constant the spacing of the heated slugs along the flowing fluid, and means counting the heated slugs which flow through the conduit.

3. Apparatus for the measurement of fluid flow comprising a conduit for the fluid, means imparting to the fluid a cyclic temperature wave travelling with the fluid along the conduit, means thermally responsive to said temperature wave detecting departure of the wave length of said temperature wave in the conduit from a predetermined value, means controlled by said detecting means in turn controlling the first mentioned means to maintain said wave length substantially constant at said predetermined value, and indicating means responsive to the cycles of said temperature wave.

4. Apparatus for the measurement of fluid flow comprising a conduit for the fluid, means imparting to the fluid a cyclic temperature wave travelling with the fluid along the conduit, means responsive to flow of the fluid controlling the first mentioned means to maintain approximately constant the wave length of said temperature wave in the conduit, means thermally responsive to said temperature wave detecting departure of the wave length of said temperature wave in the conduit from a predetermined value, means controlled by said detecting means in turn controlling the first mentioned means to maintain said wave length substantially constant at said predetermined value, and indicating means responsive to the cycles of said temperature wave.

5. Apparatus for the measurement of fluid flow comprising a conduit for the fluid, cyclically operating means imparting heat to slugs of fluid flowing through said conduit, means responsive to the raised temperature of the heated slugs controlling the cycles of the first mentioned means to maintain substantially constant the spacing of the heated slugs along the flowing fluid, and means counting the cycles of said heating means.

6. Apparatus for the measurement of fluid flow comprising a conduit for the fluid, cyclically operating means imparting heat to slugs of fluid flowing through said conduit, means responsive to the raised temperature of the heated slugs detecting departure of the heated slugs from a predetermined spacing along the flowing fluid, means controlled by said detecting means in turn controlling the cycles of the first mentioned means to maintain substantially constant the spacing of the heated slugs along the flowing fluid, and means counting the cycles of said heating means.

7. Apparatus for the measurement of fluid flow comprising a conduit for the fluid, cyclically operating means imparting heat to slugs of fluid flowing through said conduit, means responsive to flow of the fluid controlling the first mentioned means to control approximately the cycles of the first mentioned means to maintain approximately constant the spacing of the heated slugs along the flowing fluid, means responsive to the raised temperature of the heated slugs detecting departure of the heated slugs from a predetermined spacing along the flowing fluid, means controlled by said detecting means in turn controlling the cycles of the first mentioned means to maintain substantially constant the spacing of the heated slugs along the flowing fluid, and means counting the cycles of said heating means.

8. Apparatus for the measurement of fluid flow comprising means imparting identifying characteristics to slugs of the flowing fluid, means downstream of the first mentioned means responsive to said identifying characteristics of the identified slugs controlling the first mentioned means to maintain substantially constant the spacing of the idenfied slugs along the flowing fluid, and means counting the identified flowing slugs.

9. Apparatus for the measurement of fluid flow comprising means imparting identifying characteristics to slugs of the flowing fluid, means downstream of the first mentioned means responsive to said identifying characteristics of the identified slugs detecting departure of the identified slugs from a predetermined spacing along the flowing fluid, means controlled by said detecting means in turn controlling the first mentioned means to maintain substantially constant the spacing of the identified slugs along the flowing fluid, and means counting the identified flowing slugs.

References Cited in the file of this patent

UNITED STATES PATENTS

| 2,344,771 | Halliburton | Mar. 21, 1944 |
| 2,536,082 | Perkins | Jan. 2, 1951 |
| 2,569,974 | Campbell | Oct. 2, 1951 |
| 2,603,089 | Morley et al. | July 15, 1952 |

FOREIGN PATENTS

| 615,769 | Great Britain | Jan. 11, 1949 |